United States Patent Office 3,229,129
Patented Jan. 11, 1966

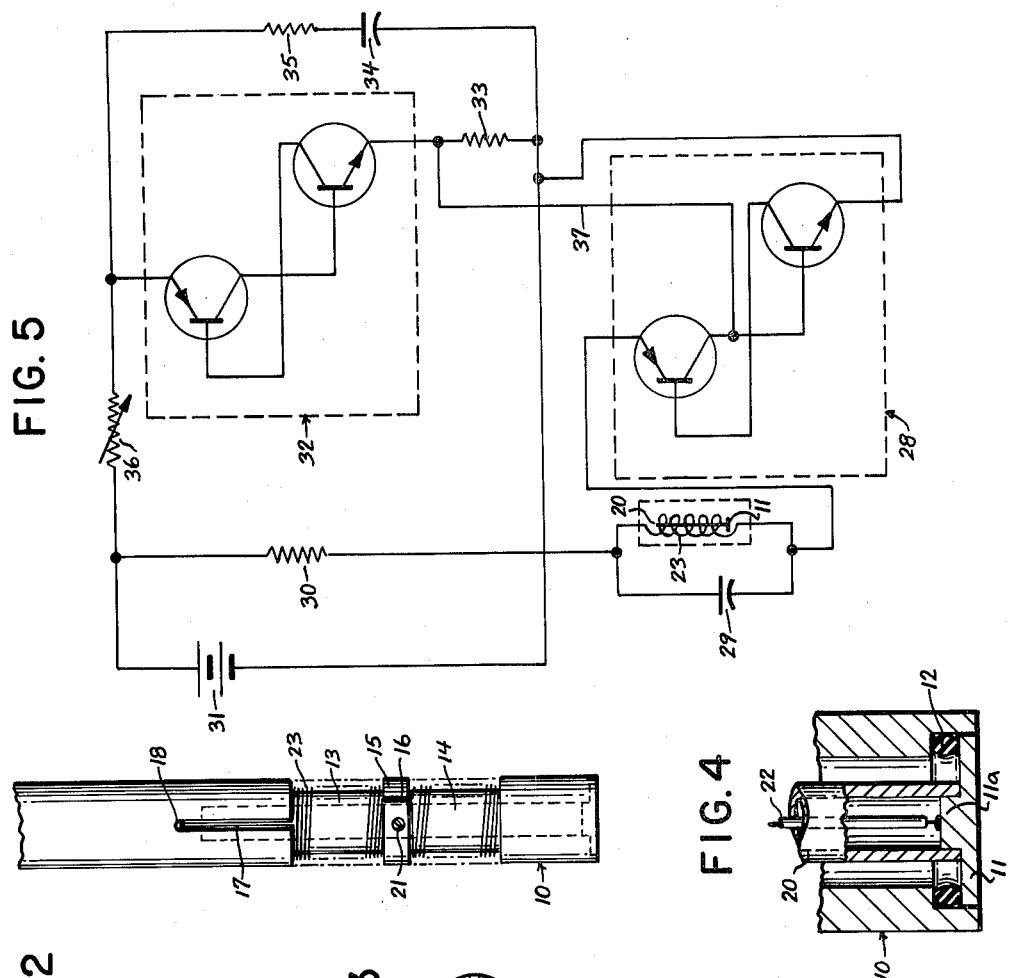
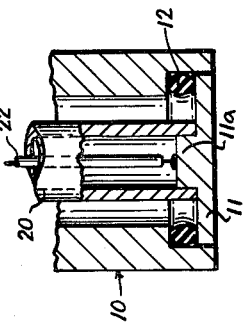
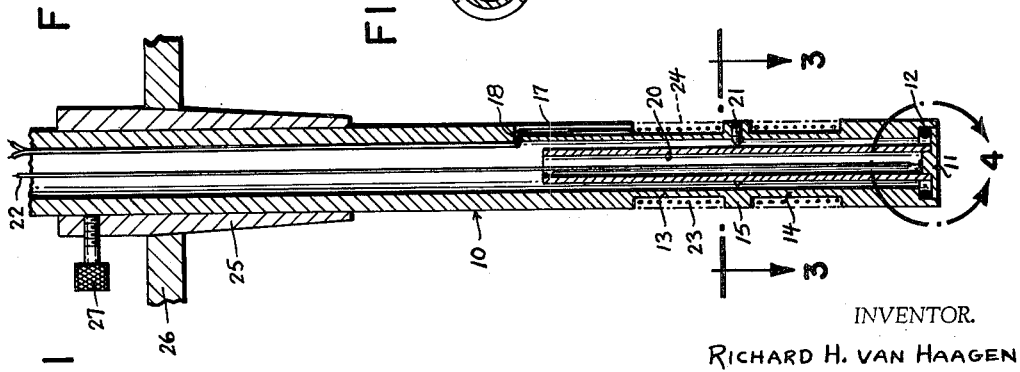

3,229,129
MAGNETOSTRICTIVELY VIBRATED ELECTRODE PROBE
Richard H. van Haagen, Kirkland, Wash., assignor to Oceanic Instruments, Inc., Houghton, Wash., a corporation of Washington
Filed Aug. 9, 1962, Ser. No. 215,950
4 Claims. (Cl. 310—26)

The present invention relates to an improved electrode probe of the type used in the measuring of the oxidation-reduction potential of a given solution.

The effective use of such probes in the past has been greatly limited for many applications, as for example in the pollution monitoring of plant effluent, because of electrode fouling by chemical, biological or botanical coatings, collections or growth on the electrodes.

Accordingly, the present invention has as its principal object the providing of an electrode probe of comparatively simple and economical construction which is self-cleaning and can operate without interruption for long periods of time. In carrying out this object the invention provides ultrasonic vibration of the electrode, and so a further object is to provide a simple, durable and reliable transducer means and related control for giving such ultrasonic vibration.

Other more particular objects and advantages will, together with the general object appear and be understood in the course of the following description and claims, the invention consisting in the novel construction and in the adaptation and combination of parts hereinafter described and claimed.

In the accompanying drawings:

FIGURE 1 is a longitudinal vertical sectional view of a probe embodying the invention.

FIG. 2 is an elevational view of the lower half of the probe.

FIG. 3 is a transverse vertical sectional view taken as shown by the line 3—3 of FIG. 1.

FIG. 4 is a detail vertical sectional view of the portion 4 indicated in FIG. 1; and FIG. 5 is a schematic of the electrical control circuit for the inductance coil of the probe.

Referring to the drawings it is seen that the probe of the present invention has a tubular body 10 which is counter-bored at its foot end to provide a seat for a stepped electrode button 11 and a silicone rubber bushing 12. This bushing is cemented to both the probe body and electrode to provide a seal therebetween while at the same time permitting the desired oscillation of the electrode relative to the probe body. The latter is fabricated from an electrically non-conductive, non-magnetic and chemically inert material such, for example, as molybdenum disulphide filled nylon and is circumferentially grooved to form a pair of winding spools 13–14 separated by a land 15. This land is notched at 16 to interconnect the spools while the spool 13 connects with the interior of the probe body via a longitudinal groove 17 terminating at a radial port 18.

Longitudinally centered with respect to the land 15 is a magnetostrictive oscillating tube 20 of nickel which rigidly interfits with the necked crown 11a of the electrode button 11 and is clamped at its longitudinal center by three circumferentially spaced set screws 21 threaded radially through the probe body at the land 15. The lead 22 for the electrode is shielded copper wire fed through the head of the probe body into the tube 20 and extending therealong to the crown 11a. Lead-tin solder may be used to make the connections between the electrode 11 and the lead 22 and oscillating tube 20, while gold plated or gold filled brass is preferred for the electrode material.

Spools 13–14 contain halves of an insulated exciting winding 23 passing therebetween through the notches 16. This winding feeds to and returns from the spool 13 through the head portion of the probe body via the port 18 and the groove 17. There normally will be several wraps on each spool. As indicated by broken lines in the drawing, the turns winding 23 are protected as by potting 24 or application of a cover sleeve.

A mounting sleeve 25 which is externally tapered may be provided for seating in an opening in the lid 26 of a container for the concerned liquid. The depth of the probe can then be readily set by a screw 27 threaded through the sleeve 25.

Directing attention to FIG. 5, the electrical control circuit for the transducer comprises a saw tooth generator, an electronic switch 28 triggered by the generator output, and a tank loop controlled by the switch and having the transducer winding 23 as its inductance component. The tank's capacitor and a related resistance are designated 29 and 30. Direct current power for the circuit, shown as being produced by a battery 31, can be derived from any standard rectifier-filter arrangement coupled to an A.C. source. In this regard, the tank and generator can have independent D.C. supplies rather than a common supply as shown.

The saw tooth generator may take the form of a four-layer diode 32 having a resistance 33 at the emitter side and a shunt capacitance 34 and resistance 35. This generator loop has its voltage controlled by a rheostat 36 so that its frequency can be synchronized to the resonant frequency of the tank 23, 29. In operation the four-layer diode 32 provides a discharge path for the capacitance 34. When power is applied to the generator loop, capacitor 34 appears as a short circuit, and as current flows through the rheostat 36 the capacitor charges until the voltage drop across it provides sufficient bias for current to flow through the diode 32. Capacitor 34 then discharges rapidly through the diode and the bias applied to the latter decreases responsively until it reaches a minimum volume for conduction. The diode then stops conducting until the capacitor recharges. This sequence keeps repeating thereby giving a sawtooth waveform to the output for triggering the switch 28 via a gate control lead 37 from the emitter-base junction of the diode.

As shown schematically, the switch 28 is a single-wafer bistable PNPN device having as its equivalent a complementary prior of PNP and NPN transistors internally constructed so that the base and collector of one are connected respectively to the collector and base of the other. One of these internal connections has the gate lead 37 thereto for causing the turn-on of the switch at the positive peaks of the sawtooth generator output. The voltage build-up across the tank loop responsive to opening of the switch 28 causes the switch to close. However, during this build-up the coil 23 is excited and produces a longitudinal magnetic field around the magnetostrictive tube 20 thereby changing the tube's physical length. In this regard, the tube 20 is given an initial length equal to one-half the wave length of the operating frequency of the metal of which the tube is made. As the current in the coil 23 oscillates with the charging and discharging of the tank's capacitor 29, the resulting oscillation of the magnetic field produced for the tube 20 causes the tube to correspondingly change in length while being centrally clamped by the screws 21. Accordingly, the electrode 11 is vibrated while independently charged through the lead 22. During this vibration the elastic O-ring 12 seals the lower end of the probe body 10.

In order for the end faces of the tube 20 to move responsive to the magnetic field produced by energizing the coil 23, the tube must have a magnetic bias. Such a bias may be produced by installation of a permanent magnet in the probe or by adding a reference winding on the probe body which is offset from the longitudinal center of the tube 20. However, I have found that by the control circuit of FIG. 5 there is sufficient residual magnetism at the time the switch 28 is triggered by the saw tooth generator to maintain the necessary bias for operation.

During each cycle of the tank loop there are of course energy losses in the probe which would dampen the amplitude of the oscillation wave of the magnetic field were it not for supplementation. The latter is controlled by the switch 28, and the triggering cycle thereof must be synchronized with the resonance of the tank loop. This is accomplished by adjusting the rheostat 36 so as to set the period of the saw tooth generator at the tank resonant frequency. In this regard, the components of the tank 23, 29 are selected to give the tank substantially the same resonance as the natural resonance of the magnetostrictive tube 20.

By the described invention the electrode 11 is continuously vibrated in the lower ultrasonic range while in operation, as for example at about 32 kc., and is thereby kept clean and free of contamination from the operating solution.

It is thought that the invention will have been clearly understood from the foregoing detailed description. Changes will suggest themselves and may be resorted to without departing from the spirit of the invention, wherefore it is my intention that no limitations be implied and that the hereto annexed claims be given a scope fully commensurate with the broadest interpretation to which the employed language fairly admits.

What I claim is:

1. In a probe, an exposed electrode, an elongated magnetostrictive tube having one of its ends connected to said electrode, a shield for said tube, elastic sealing means interconnecting said electrode and shield, means carried by said shield for clamping said tube intermediate its ends relative to the shield, means for producing a magnetic bias in said tube, means including an inductance winding carried by said shield in surrounding relation to said tube for producing an oscillating longitudinal magnetic field for said tube, and a lead extending through said tube and connected to said electrode.

2. In a probe, shield means, an exposed electrode carried by said shield means, an elongated magnetostrictive member in said shield means and connected to said electrode, set screw means in said shield means and clamping said member relative thereto, and an inductance winding on said shield means and surrounding said member.

3. In combination, a tank loop, and elongated magnetostrictive means controlled by the oscillating magnetic field produced by the inductance of said tank loop.

4. The structure of claim 3 in which said magnetostrictive means is clamped at its longitudinal center and has a length substantially equal to one-half the wave length at the resonant frequency of the tank.

References Cited by the Examiner

UNITED STATES PATENTS

| | | | |
|---|---|---|---|
| 1,092,453 | 4/1914 | Rainey | 310—26 |
| 1,543,124 | 6/1925 | Recker | 340—11 |
| 1,937,333 | 11/1933 | Dome | 318—118 |
| 1,962,154 | 6/1934 | Pierce | 318—118 X |
| 1,962,155 | 6/1934 | Pierce | 318—118 X |
| 1,966,446 | 7/1934 | Hayes | 310—26 |
| 2,000,024 | 5/1935 | Ide | 318—118 |
| 2,015,479 | 1/1936 | Hayes | 340—11 |
| 2,044,807 | 6/1936 | Noyes | 318—18 |
| 2,101,272 | 12/1937 | Scott | 310—36 |
| 2,434,926 | 1/1948 | Hayes | 340—11 |
| 2,487,815 | 11/1949 | Lee | 310—26 |
| 2,530,224 | 11/1950 | Camp | 310—26 |
| 2,842,666 | 7/1958 | Woodcock et al. | 331—145 |
| 2,848,672 | 8/1958 | Harris | 318—118 |
| 2,988,708 | 6/1961 | Schmidt | 331—11 |
| 2,991,429 | 7/1961 | Force | 331—111 |

FOREIGN PATENTS

| | | |
|---|---|---|
| 1,032,494 | 3/1953 | France. |

ORIS L. RADER, *Primary Examiner.*

MILTON O. HIRSHFIELD, *Examiner.*